United States Patent

Kiely et al.

[11] Patent Number: 5,088,333
[45] Date of Patent: Feb. 18, 1992

[54] SYSTEM FOR TESTING ELASTIC COMPONENTS AND METHODS OF USING SAME

[76] Inventors: John Kiely, P.O. Box 332, Paris, Ontario, Canada, N3L 3G2; Peter Van Kruistum, R.R. #4, Brantford, Ontario, Canada, N3T 5L7

[21] Appl. No.: 427,426

[22] Filed: Oct. 27, 1989

[51] Int. Cl.⁵ .......................... G01L 5/00; G06F 15/46
[52] U.S. Cl. ...................... 73/862.53; 73/161
[58] Field of Search ............... 73/161, 789, 790, 796, 73/798, 806, 816, 825, 837, 862.53, 862.54

[56] References Cited

U.S. PATENT DOCUMENTS

| | | | |
|---|---|---|---|
| 2,655,809 | 10/1953 | Edens | 73/161 |
| 3,165,926 | 1/1965 | Orr et al. | 73/161 |
| 4,616,508 | 10/1986 | Jorn | 73/825 X |
| 4,750,131 | 6/1988 | Martinez | 73/862.53 X |
| 4,862,742 | 9/1989 | Pospischil et al. | 73/161 |

FOREIGN PATENT DOCUMENTS 0023985  2/1977  Japan .................................. 73/161

Primary Examiner—Charles A. Ruehl
Attorney, Agent, or Firm—Joseph A. Day

[57] ABSTRACT

A system for rapid, easy testing of elastic components under compression or tension is disclosed. The system comprises a force measurement apparatus having a device which applies either a compression or tension force to the elastic component. The device measures the force applied to the component and transmits this information to an interface unit. A transducer, which is detachably connected to the component, measures the deflection in the metal and transmits this information to the interface unit. The interface unit comprises computer hardware and software which changes the analog signals it receives to digital signals and transmits these to a personal computer. The computer controls the test and displays the test results.

2 Claims, 4 Drawing Sheets

SYSTEM FOR TESTING ELASTIC COMPONENTS AND METHODS OF USING SAME

BACKGROUND OF THE INVENTION

1. Field of the Invention

The present invention relates generally to systems for testing the quality of elastic components and more specifically to systems for testing the quality of metal components such as clutch discs, leaf springs or coil springs.

2. Prior Art of the Invention

The previously known method for testing the quality of an elastic component was placing the component in a force measurement apparatus, applying a force to the component, measuring the displacement of the metal while maintaining the force; increasing the force applied, and repeating the latter two steps until the necessary results were obtained.

This method of testing is both laborious and time consuming, and, because the force has to be maintained on the component while the displacement of the metal is measured, components frequently fail during testing or give false results through metal fatigue.

These disadvantages in the known testing method have resulted in the testing of components on a random basis before installation, as opposed to the testing of each individual component. The method therefore increase the risk of installing a defective component.

SUMMARY OF THE INVENTION

The present invention provides for rapid, easy testing of elastic components, such as clutch disc, coil springs and leaf springs. The average test on a clutch disc, for example, takes approximately three seconds. This allows the manufacturer to test every component before installation, thereby reducing the risk of installing a defective component. The present invention therefore improves the quality of the end product.

The present invention comprises a force measurement apparatus having a device which applies either a compression or tension force to an elastic component. The device measures the force applied to the component and transmits this information to an interface unit. A transducer which is detachably connected to the component, measures the deflection in the metal and transmits this information to the interface unit. The interface unit changes the analog signals it receives to digital signals and transmits these to a personal computer. The computer controls the test and displays the test results.

A base is disposed inside the force measurement apparatus and a support member, configured to be compatible with the elastic component, is attached to the base. The support member holds the component and prevents it moving out of position when the force is applied to it.

As the device applies a force to the component it measures the force being applied and transmits this information to the interface unit. Since the force is applied slowly, the device measures and transmits essentially continuous data to the interface unit. The corresponding deflection of the metal is measured by the transducer which consequently also transmits essentially continuous data to the interface unit.

The interface unit comprises computer software and hardware which translates the analog information received into digital signals and then feeds these signals to a personal computer.

The personal computer controls the force measurement apparatus and acquires and displays the test results. The sampling begins with an external input from the computer and terminates when a minimum value of force is exhibited. The computer then returns the force measurement apparatus to initial conditions and awaits the command for another test.

BRIEF DESCRIPTION OF THE DRAWINGS

The preferred embodiment of the present invention will now be described in more detail with the aid of the annexed drawings, in which.

DESCRIPTION OF THE PREFERRED EMBODIMENT

Figure 1:
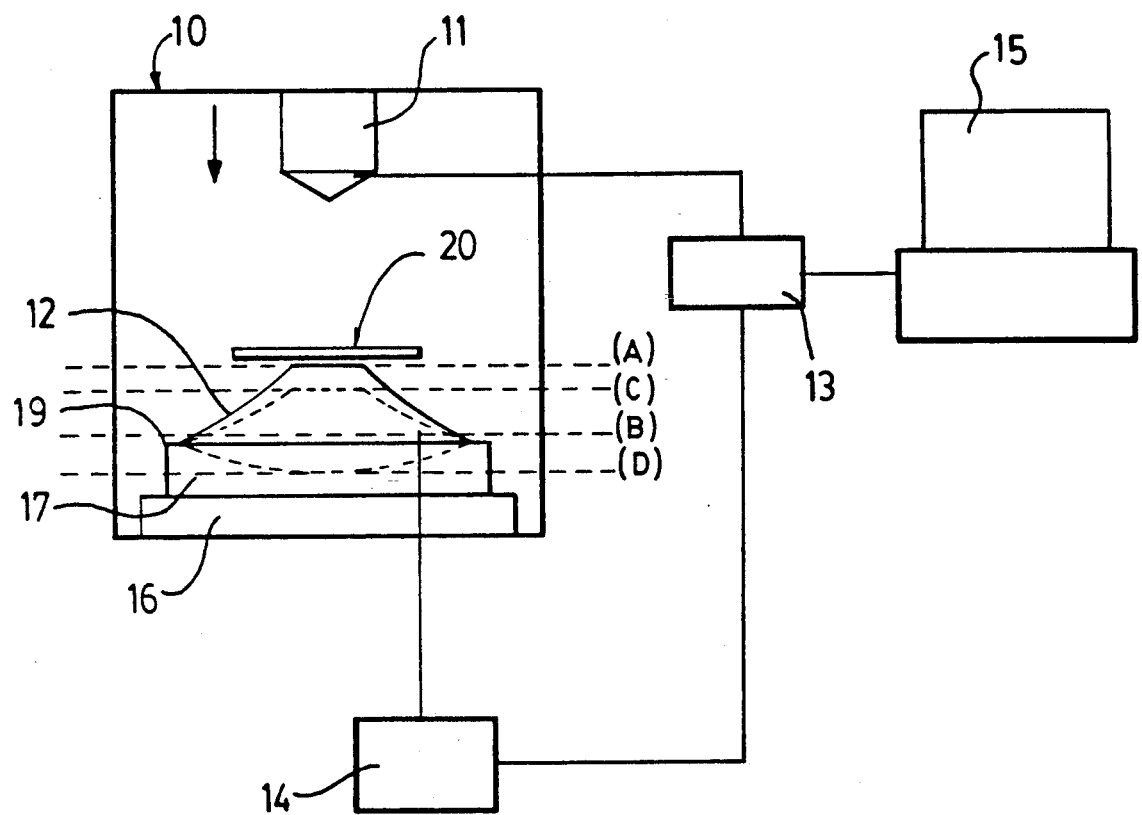
FIG. 1 is a schematic drawing of the system according to the present invention.

For the purpose of illustration only, the system will be described for testing a clutch disc under compression. The system can, however, be used to test any other elastic component, such as the flat spring of an automatic transmission system; and can be used to test any elastic component under either compression or tension.

It is important to have an appreciation as to the setting of a clutch which will give the best engagement and, therefore, the best operation of the clutch. In order to determine this correct setting, it is necessary to determine at which point in the compression of the clutch disc, the greatest pressure has to be applied to displace and move the metal of the disc.

The present invention comprises a force measurement apparatus 10 having an hydraulic or pneumatic press 11 disposed to apply a force to a clutch disc 12. The press 11 measures the force applied to the clutch disc 12 and transmits this information to an interface unit 13. A transducer 14 is disposed to measure the deflection in the clutch disc 12 and to transmit this information to the interface unit 13. The interface unit 13 changes the analog signals it receives from the press 11 and transducer 14 to digital signals and transmits these to a personal computer 15. The computer 15 displays the test results.

Figure 2:
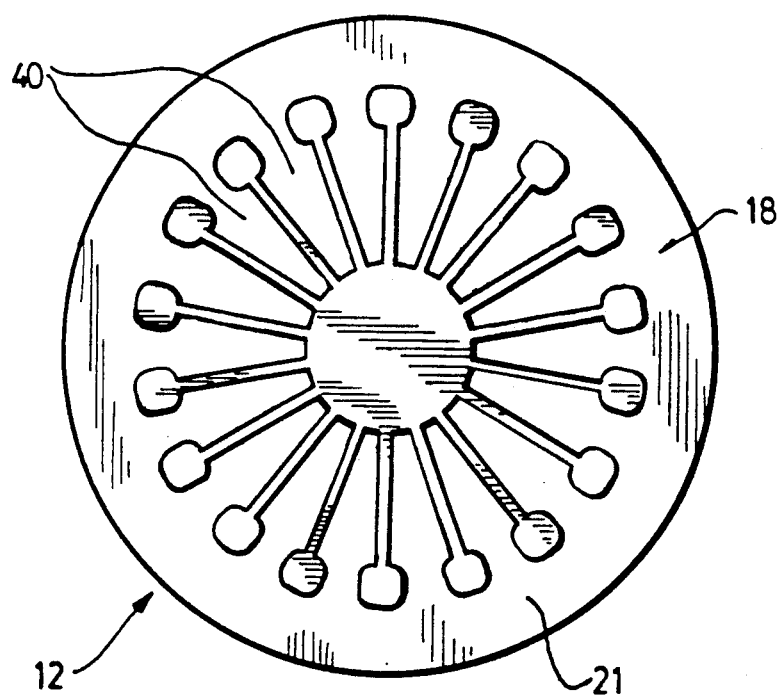
FIG. 2 is a top view of a clutch.
Figure 3:
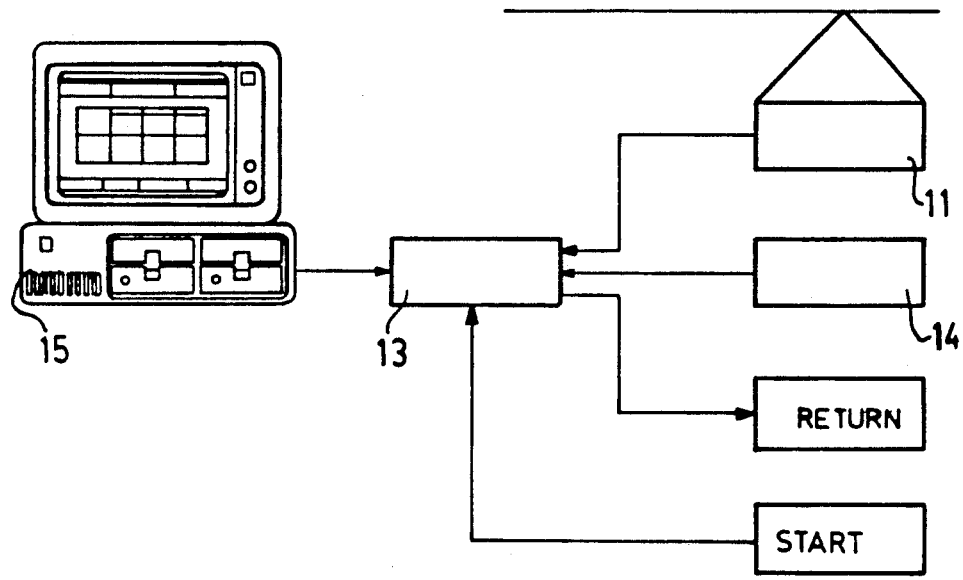
FIG. 3 is a flow chart of the system according to the present invention.

Referring to FIGS. 1, 2 and 3, a base 16 is disposed inside the force measurement apparatus 10 and a support member 17, configured to be compatible with the elastic component, is attached to the base 16. The support member 17 used to support a clutch 12 is in the shape of a hollow cylinder. The outer edge 18 of the clutch 12 is positioned on the rim 19 of the support member 17 and the clutch 12 is held in place by the support member 17. A plate 20 is disposed between the clutch 12 and the press 11. As the press 11 moves slowly downwardly in the direction of the arrow in FIG. 1, it comes into contact with the plate 20 and forces it into the clutch 12. The plate 20 contacts the clutch 12 only in the area 21 immediately surrounding the base of the fingers 22. The force applied by the press 11 is transmitted through the plate 20 to this area 21, and as the press 11 continues to move downwardly, the force causes the area 21 to deflect.

The press 11 is connected to an interface unit 13. When the press 11 applies force to the clutch 12, it measures the force applied and transmits this data to the interface unit 13. Since the press 11 moves downwardly very slowly, it measures and transmits essentially continuous data to the interface unit 13. For application to the typical automobile clutch, a desirable press 11 has a range from 200 to 5000 pounds and an accuracy of 0.05% of full scale for both tension and compression.

The area 21 of the clutch 12 deflects as force is applied by the press 11 and the degree of displacement of the metal is measured by a transducer 14 which is detachably connected to the clutch 12. The transducer 14 is also connected to the interface unit 13 and it transmits the displacement measurements to the interface unit 13. Since the force applied to the clutch 12 increases slowly, the degree of deflection of the metal changes slowly and the transducer 14 therefore transmits essentially continuous deflection measurements to the interface unit 13. For the typical automobile clutch application, a desirable transducer 14 has a range of +0.25 inches to −0.25 inches and an accuracy of 0.05% of full scale. If a press of 2000 pound capacity is used, the force is accurate to the nearest pound and the displacement to the nearest 0.0001 of an inch.

The interface unit 13 comprises computer software and hardware which translates the analog information received from the press 11 and the transducer 14 into digital signals and then feeds these signals to a personal computer 15.

The personal computer 15 is used to control the force measurement apparatus and to aquire and display the test results. The sampling rate is 1000 samples per second, based on the two analog inputs of force and displacement. The sampling begins with an external input from the computer and terminates when a minimum value of force is exhibited. The computer then returns the force measurement apparatus to initial conditions and awaits the command for another test. The test of a clutch 12 takes approximately 3 seconds to conduct.

Figure 4:
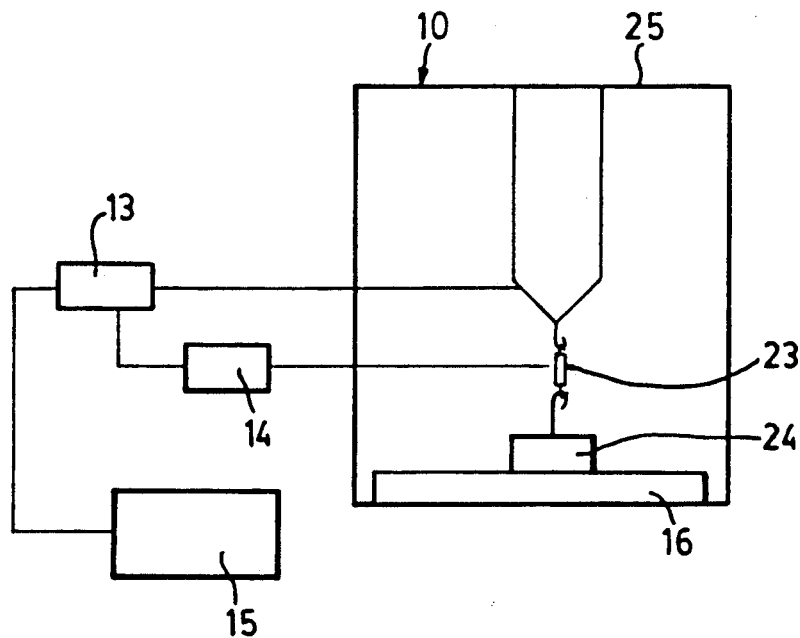
FIG. 4 is a side view of the force measuring apparatus showing a coil spring being tested by the system.

The system may also be used to test elastic components under tension. Referring to FIG. 4, a coil spring 23 is attached to a spring support member 24, which in turn is connected to the base 16. The arm 25 is moved upwardly in the direction of the arrow, thereby putting the spring under tension. The arm 25 measures the force applied to the coil spring 23 and transmits this information to an interface unit 13. A transducer 14 measures the displacement of the coil spring 23 and transmits this information to the interface unit 13. The interface unit 13 converts the analog data into digital signals and feeds these to a personal computer 15 for display.

Figures 5A, 5B:
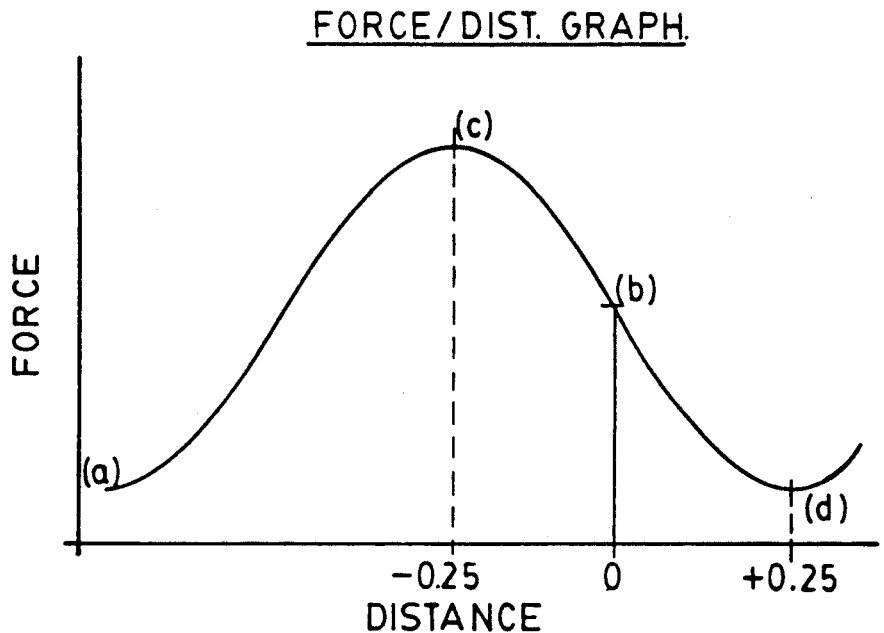
FIG. 5A and FIG. 5B illustrate typical test results which would be displayed on the personal computer monitor or printer in graph form and table form respectively.

The system's test results may be displayed and printed by the personal computer 15 in both a graph format and table format. Referring to FIGS. 1 and 5B, the initial position of the area 21 of the clutch 12 is shown at line (A) and point (a). As pressure is applied, the metal displaces and at one stage during a test, the area 21 will lie substantially parallel to the base 16. This position is referred to as the "gauge position" and is shown as line (B) and at point (b). The optimum setting of a clutch 12 is at the position where the greatest force needs to be applied in order to displace the metal. This position is referred to as the "peak position" and is shown as line (C) and point (c). The optimum setting of the clutch 12, according to the test results shown, is therefore at 0.25 inches above the guage position.

As force continues to be applied to the clutch 12, the metal deflects to a position shown as line (D) and point (d). At this position very little force needs to be applied to cause the metal to deflect. This is known as the "valley position". In the example, the valley position is reached when the area 21 lies 0.25 inches below gauge position. At this point the test automatically ceases and the personal computer 15 stands by to receive a command to begin the testing procedure again.

The embodiments of the invention in which an exclusive property or privilege is claimed are defined as follows:

1. A method for determining the optimum setting of a clutch in a system comprising a support member for holding the clutch, a means for applying a compressive force to the clutch when held by the support member and for measuring the force applied, a transducer which is detachably attached to the clutch for measuring the displacement of the clutch in response to the force applied, an interface unit connected to the transducer and to the means for applying force, which interface unit collects the force and displacement measurements, converts them to digital signals and transmits them to a personal computer; said method comprising the steps of:

(a) attaching the clutch to the support member;
   (b) applying a force to the clutch;
   (c) determining from the readout from the personal computer, the position of the clutch at which the greatest pressure was applied to displace the clutch.

2. A method for determining the optimum setting of a clutch as defined in claim 1, wherein the force is applied to the clutch slowly and steadily and the interface unit therefore receives substantially continuous data from the transducer and from the means for applying the force.

* * * * *